United States Patent
Dusterhoft et al.

(10) Patent No.: US 11,920,435 B2
(45) Date of Patent: Mar. 5, 2024

(54) SUB-SURFACE SAFETY VALVE ASSEMBLY

(71) Applicant: Halliburton Energy Services, Inc., Houston, TX (US)

(72) Inventors: Ross G. Dusterhoft, Nottingham Dr., TX (US); Bharat B. Pawar, Carrollton, TX (US); Brad R. Pickle, Pottsboro, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 209 days.

(21) Appl. No.: 16/639,299

(22) PCT Filed: May 24, 2019

(86) PCT No.: PCT/US2019/034048
§ 371 (c)(1),
(2) Date: Feb. 14, 2020

(87) PCT Pub. No.: WO2020/242446
PCT Pub. Date: Dec. 3, 2020

(65) Prior Publication Data
US 2022/0010652 A1 Jan. 13, 2022

(51) Int. Cl.
*E21B 34/14* (2006.01)
*E21B 34/10* (2006.01)
(Continued)

(52) U.S. Cl.
CPC .............. *E21B 34/14* (2013.01); *E21B 34/10* (2013.01); *F16K 1/20* (2013.01); *F16K 31/46* (2013.01); *E21B 2200/05* (2020.05)

(58) Field of Classification Search
CPC ........ E21B 34/14; E21B 2200/05; F16K 1/20; F16K 31/46
See application file for complete search history.

(56) References Cited

U.S. PATENT DOCUMENTS 3,051,245 A * 8/1962 Andrew ................ E21B 49/087
166/333.1
4,562,853 A  1/1986 Tschirky et al.
(Continued)

FOREIGN PATENT DOCUMENTS

GB       2195687 A    4/1988
GB       2218133 A   11/1989
JP     H06249347 A    9/1994

OTHER PUBLICATIONS

International Search Report and Written Opinion dated Feb. 21, 2020, issued in related PCT/US2019/034048.

*Primary Examiner* — Robert E Fuller
(74) *Attorney, Agent, or Firm* — Barnes & Thornburg, LLP

(57) ABSTRACT

A sub-surface safety valve having a positional flapper, a valve seat, and a remotely actionable opening prong. The opening prong comprising at least one of a debris wiper, filter, and at least one flow hole. The wiper, filter, and at least one flow hole function according to either position or movement of the flapper and opening prong and prevent debris buildup around the valve seat. The wiper is an extendible material in communication with the valve seat and a surface of the opening prong and it extends radially in response to closing the valve. The extension of the wiper in response to closing the flapper cause the wiper to scrape the surface of the valve seat. The filter can comprise a screen integrated with or attached to the opening prong. The flow holes can be in the form of angled flow holes or elongated slots.

14 Claims, 12 Drawing Sheets

(51) Int. Cl.
*F16K 1/20* (2006.01)
*F16K 31/46* (2006.01)

(56) References Cited

U.S. PATENT DOCUMENTS

| | | | | |
|---|---|---|---|---|
| 5,503,229 | A * | 4/1996 | Hill, Jr. | E21B 34/101 |
| | | | | 166/324 |
| 7,231,986 | B2 * | 6/2007 | Read, Jr. | E21B 41/00 |
| | | | | 166/386 |
| 7,896,082 | B2 * | 3/2011 | Lake | E21B 37/02 |
| | | | | 166/375 |
| 8,844,631 | B2 * | 9/2014 | Anderson | E21B 21/12 |
| | | | | 166/311 |
| 9,200,501 | B2 * | 12/2015 | Patton | E21B 34/06 |
| 2010/0230109 | A1 | 9/2010 | Lake et al. | |
| 2011/0094742 | A1 | 4/2011 | Badalamenti et al. | |
| 2016/0002992 | A1 * | 1/2016 | Rushton | E21B 7/06 |
| | | | | 175/317 |
| 2018/0334883 | A1 | 11/2018 | Williamson | |

* cited by examiner

SUB-SURFACE SAFETY VALVE ASSEMBLY

BACKGROUND

Sub-Surface Safety Valves (SSSVs) are component parts of production tubing systems for drawing fluids from hydrocarbon reservoirs. In the event of a catastrophic failure, the SSSV can be triggered whereupon a main channel or bore in the production tubing system is closed off. SSSVs may be required to undergo and pass industry standard testing which includes low-pressure gas leakage measurements following exposure to sandy environments before the equipment can be introduced into the market. The ability of a SSSV to operate reliably in the presence of sand at low gas pressures is an issue of particular interest.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Presented herein is an SSSV that incorporates at least one of a flow holes, a filter and a flexible and extendible scraper/wiper ring with an opening prong and a closure mechanism to prevent sand or debris build up around a valve seat. The flow holes and filter provide a fluid flow path back into an Internal Diameter (ID) of the opening prong so that fluid can be circulated over the valve seat and gasket to reduce sand build-up around this area. The extendible wiper functions to wipe the sealing surfaces of the valve seat and gasket in response to linear movement of the opening prong when opening and closing the closure mechanism. The filter can be in the form of a screen. The screen can be positioned near the valve seat and seal (gasket) of the SSSV. In this configuration, a flow path of the fluid traverses through the screen from the ID of the SSSV to wash away debris from the valve seat.

These features reduce lengthy testing periods required for SSSVs to pass low-pressure leak tests as part of the API (American Petroleum Institute) sand test. By eliminating the number of iterations required to get new SSSVs to pass, a large reduction in development cost and time to release the products to market can be realized. These features also improve the reliability of the SSSV's ability to close in the presence of sand at low gas pressures.

In this specification, the terms downstream and upstream refer to in the direction of a well head or the surface, or a location closer thereto, and in the direction of a reservoir, or a location closer thereto, respectively. The terms open and close as it related to the SSSV (flapper) refer to a main bore of a production tubing system open and closed, respectively.

Figure 1A:
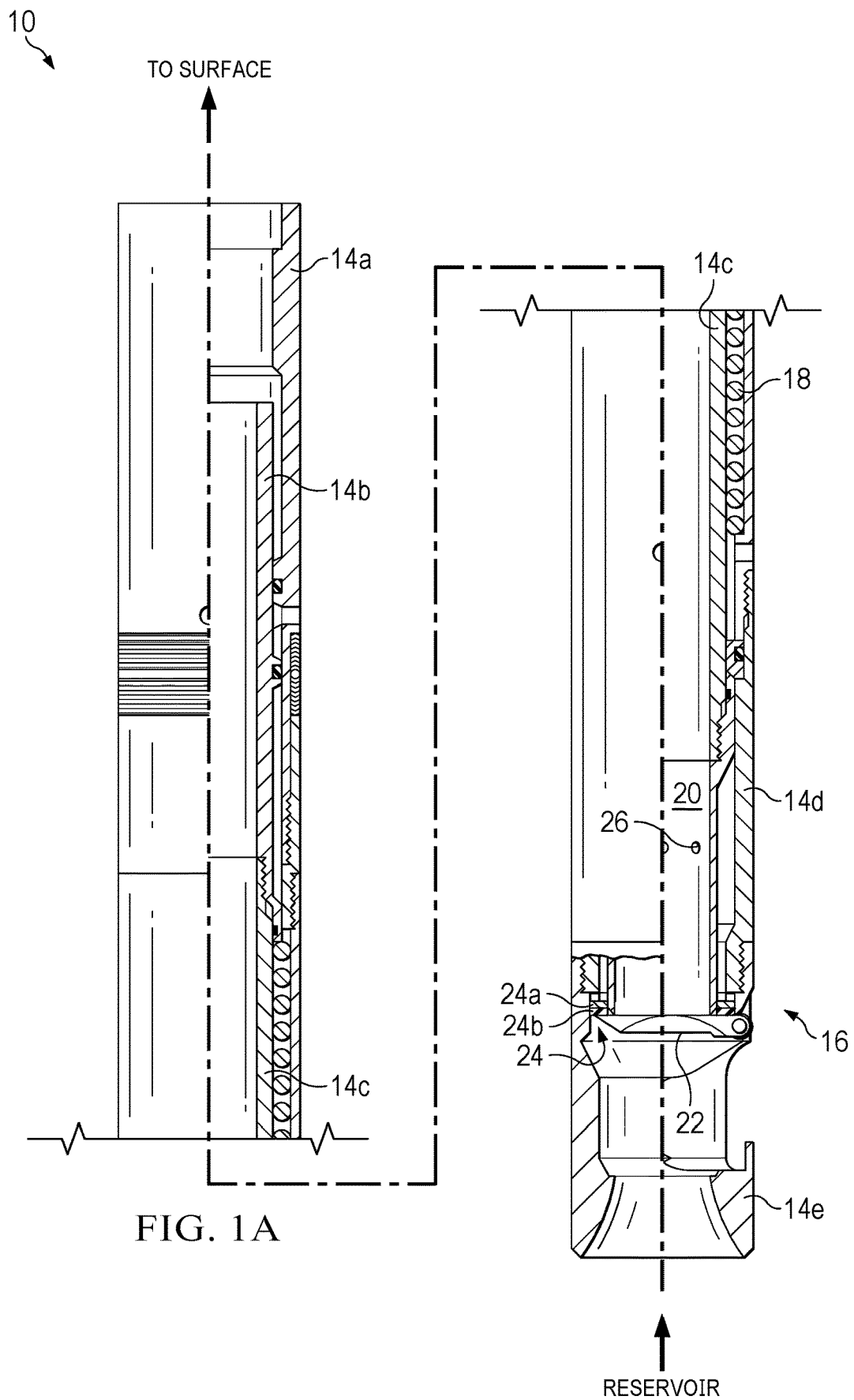
FIG. 1A and FIG. 1B are illustrations of an SSSV within a wellbore for drawing fluid from a reservoir, in accordance with certain example embodiments.
Figure 1B:
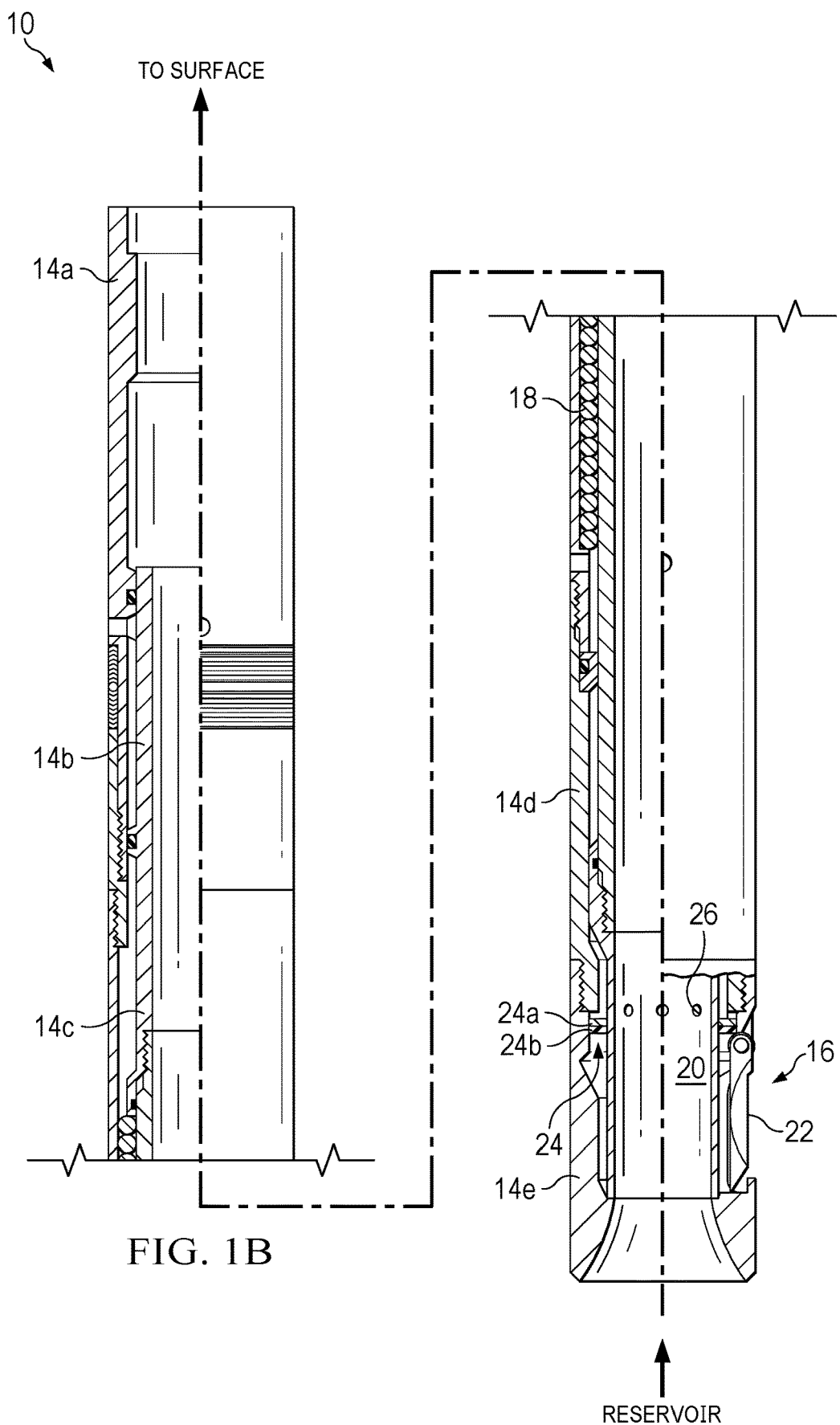

Referring now to FIG. 1A and FIG. 1B, illustrated is an SSSV within a wellbore for drawing fluid from a reservoir, in accordance with certain example embodiments, denoted generally as 10. The wellbore 10 includes an integrated SSSV 16 comprising body joints 14*a* and 14*e* and an SSSV activator 18. The SSSV 16 is integrated with a production tubing system (not shown). SSSV 16 further comprises an opening prong 20, flapper 22, valve seat 24*a*, and, optionally, a gasket 24*b*. The SSSV 16 is open-able by hydraulic pressure and close-able by the activator 18. In this particular embodiment, the opening prong 20 comprises several flow holes 26. The valve seat 24*a* and gasket 24*b* are positionable around the opening prong 20 and secured to body joint 14*d*. The opening prong 20 is slide-able through the valve seat 24*a* and gasket 24*b*. The flapper 22 secured to the body joint 14*d* can be a force compression hinge biased to a closed position. The SSSV activator 18 can be a power spring and is a failsafe mechanism that can be remotely activated to close the SSSV, e.g. when hydraulic pressure is lost. In FIG. 1A, the opening prong 20 is in a retracted state and the flapper 22 is in a closed position preventing reservoir fluid from flowing through a main bore of the production tubing system. In FIG. 1B, the opening prong 20 is in an extended state and the flapper 22 is in an open position allowing reservoir fluid to flow through the main bore.

Figure 2A:
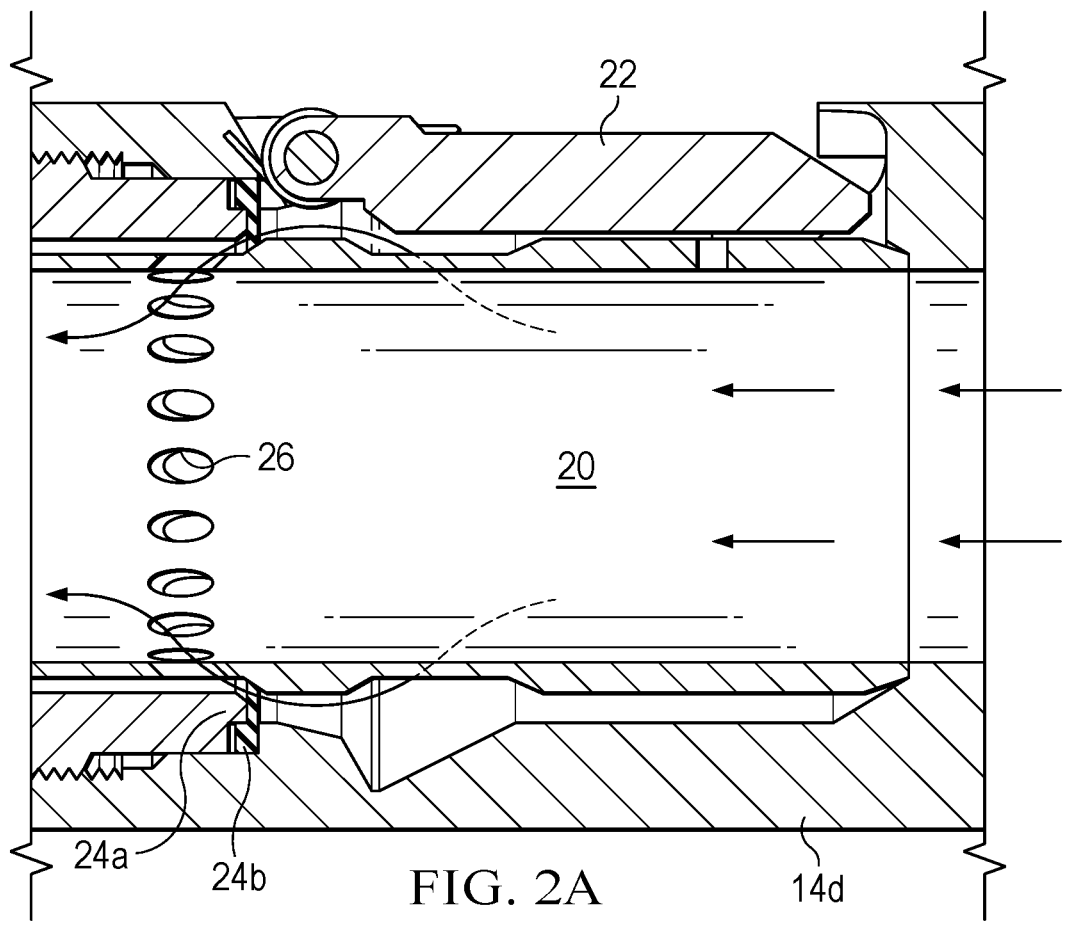
FIG. 2A is an illustration of a side view an SSSV with flow holes, in accordance with certain example embodiments.
Figure 2B:
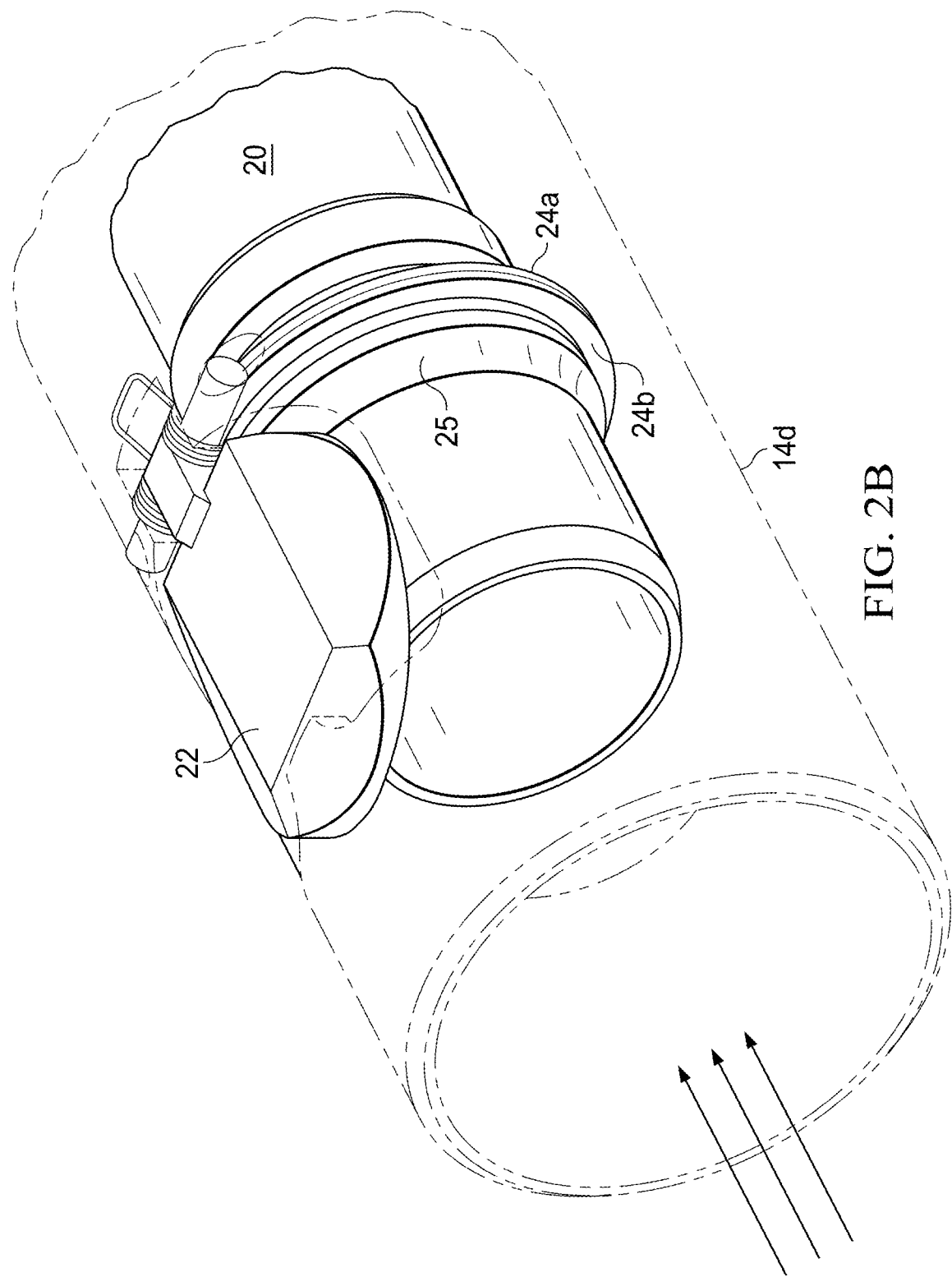
FIG. 2B is an illustration of an isometric view of the SSSV with flow holes.

Referring now to FIG. 2A, illustrated is a side view of an SSSV 16 with flow holes, according to certain example embodiments. The SSSV comprises the opening prong 20 within body joint 14 *d* and the valve seat 24 *a* fixed to body joint 14 *d*. The opening prong 20 comprises flow holes 26, for example angled flow holes. Angled flows holes can create smoother flow when fluid velocities are high, i.e. they create less drag. In the open position with the opening prong 20 extended, the fluid travelling downstream can rinse the surface of the valve seat and circulate back through the ID of the opening prong, in effect washing debris away from surface of the seal seat. In essence, the flow holes 26 provide a circulation path and, therefore, prevent water and debris from stagnating around the annulus between the body joint 14 *d* and the opening prong 20. FIG. 2B is an isometric view of the SSSV 16. The opening prong 20 can further comprise a debris wiper 25 secured to the prong 20. In response to an action of the opening prong 20, the wiper 25 either extends radially or flattens out, depending on whether the opening prong 20 is extending or retracting, and, as a result, the surface of the valve seat 24 *a* or gasket 24 *b* is wiped of debris, such as sand. The wiper 25 can be made of metal, alloys, plastics, elastomer, non-elastomer polymers, or any combination thereof and can be secured to the prong 20 using fasteners, nails, welds, screws, rivets, etc.

Figure 3A:
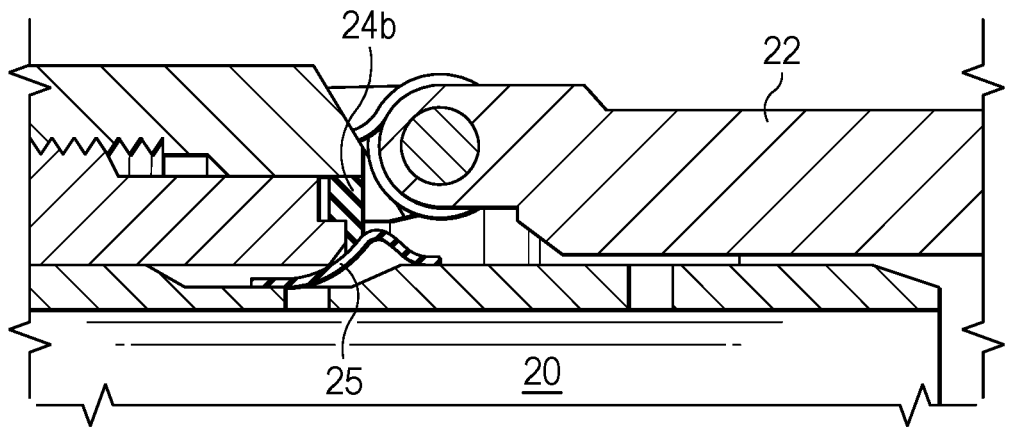
FIGS. 3A and 3B are illustrations of side views of the SSSV with a wiper in an extended state and a flattened state, according to certain example embodiments.
Figure 3B:
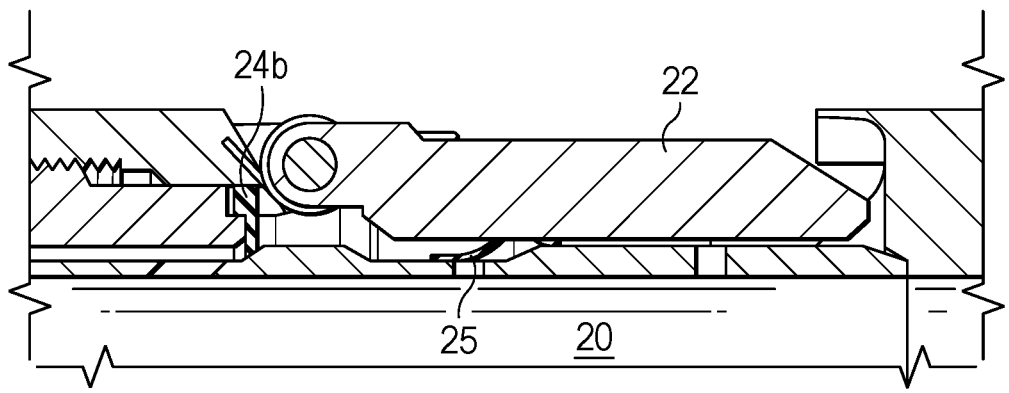

Referring now to FIGS. 3A and 3B, illustrated is a side view of the SSSV with the wiper 25 in an extended state and a flattened state, in accordance with certain example embodiments. In response to the opening prong 20 retracting, the wiper 25 compresses and extends radially that causes the wiper 25 to scrape the surface of the valve seat 24*a*, as illustrated in FIG. 3A. In response to the opening prong 20 extending, which opens the flapper 22, the wiper 25 extends axially and flattens under the flapper 22, as illustrated in FIG. 3B.

Figure 4A:
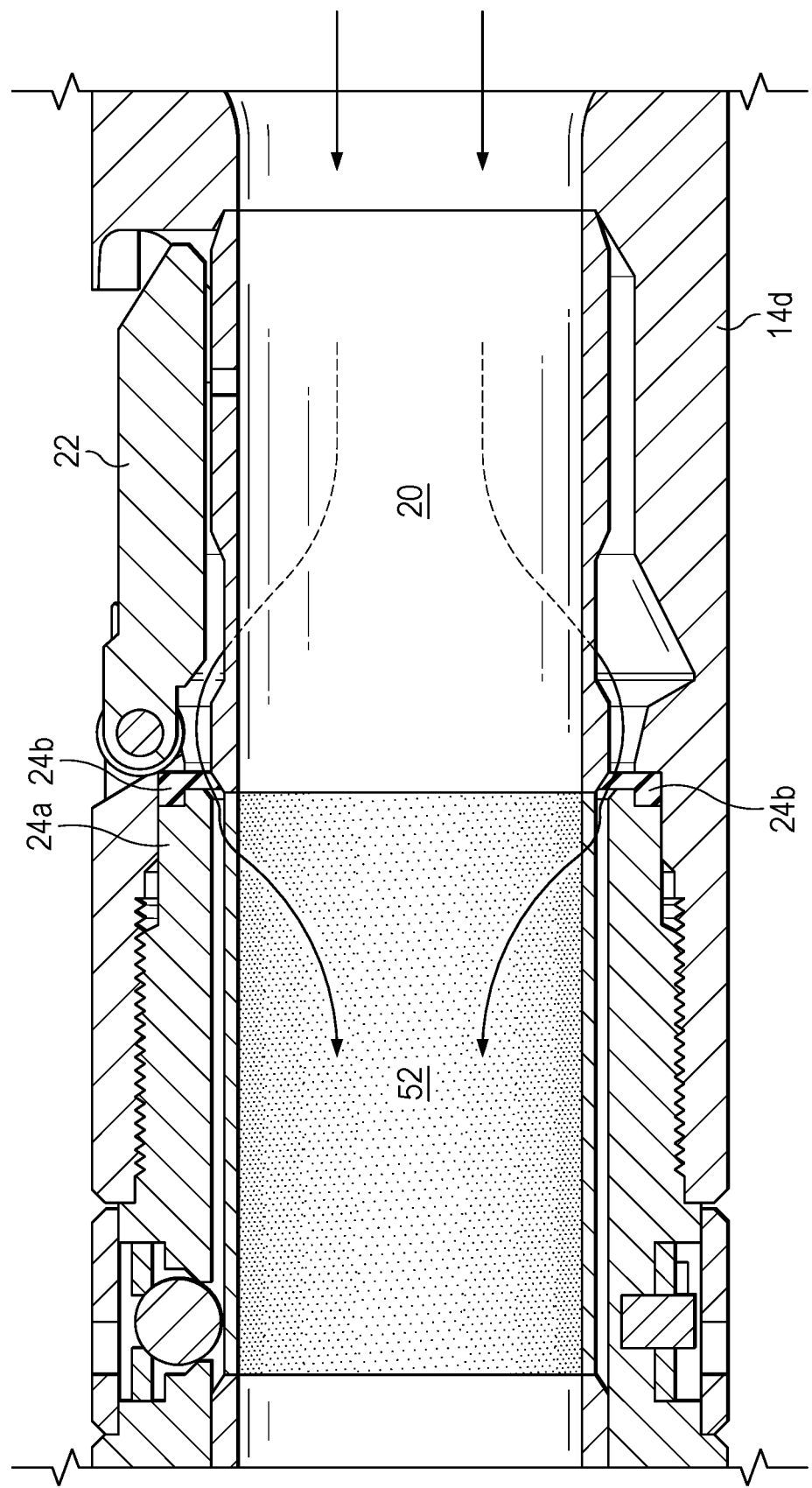
FIG. 4A is an illustration of a side view of the SSSV and a screen, in accordance with certain example embodiments.
Figure 4B:
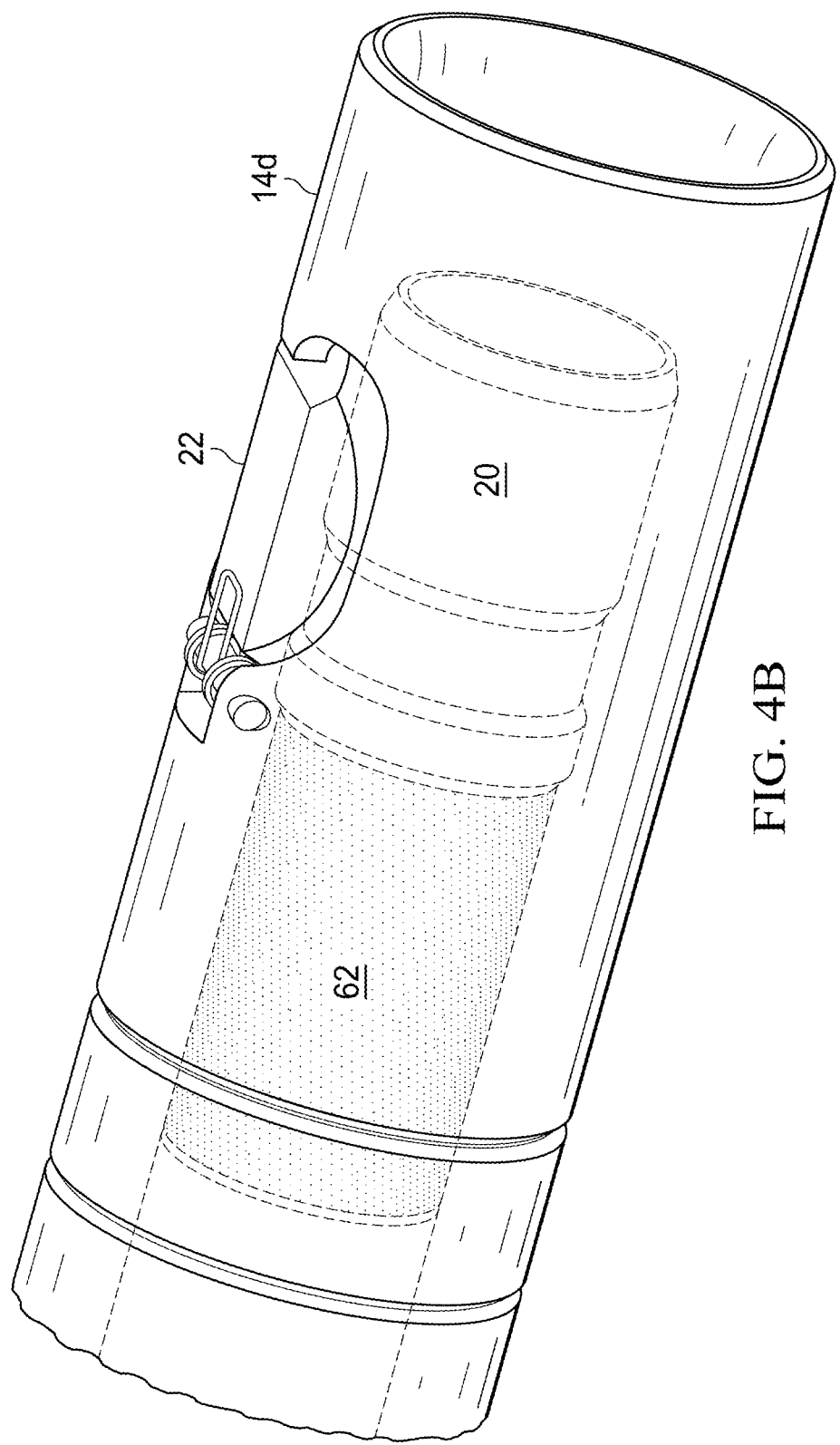
FIG. 4B is an illustration of an isometric view of the SSSV wherein the screen is an integrated component of the opening valve, in accordance with certain example embodiments.

Referring now to FIG. 4A, illustrated is a side view of the SSSV and a screen, in accordance with certain example embodiments. The SSSV comprises the opening prong 20 within the body joint 14*d*, the flapper 22, and valve seat 24*a*. The flapper 22 fixed to the body joint 14*d* and the valve seat 24*a* and gasket 24*b* positioned around the opening prong 20. In this particular embodiment, the opening prong 20 includes a screen 52 in the form of a sleeve that is fitted around the opening prong 20. Fluid travelling downstream can circulate over the valve seat 24*a* and gasket 24*b* and debris swept therefrom can be filtered at the screen 52. The screen 52 can be welded onto the opening prong 20 or otherwise fixed to the opening prong 20. FIG. 4B illustrates the SSSV wherein a screen 62 is an integrated component of the opening prong 20. The screens 52, 62 can be made of varying size meshes.

Figure 5:
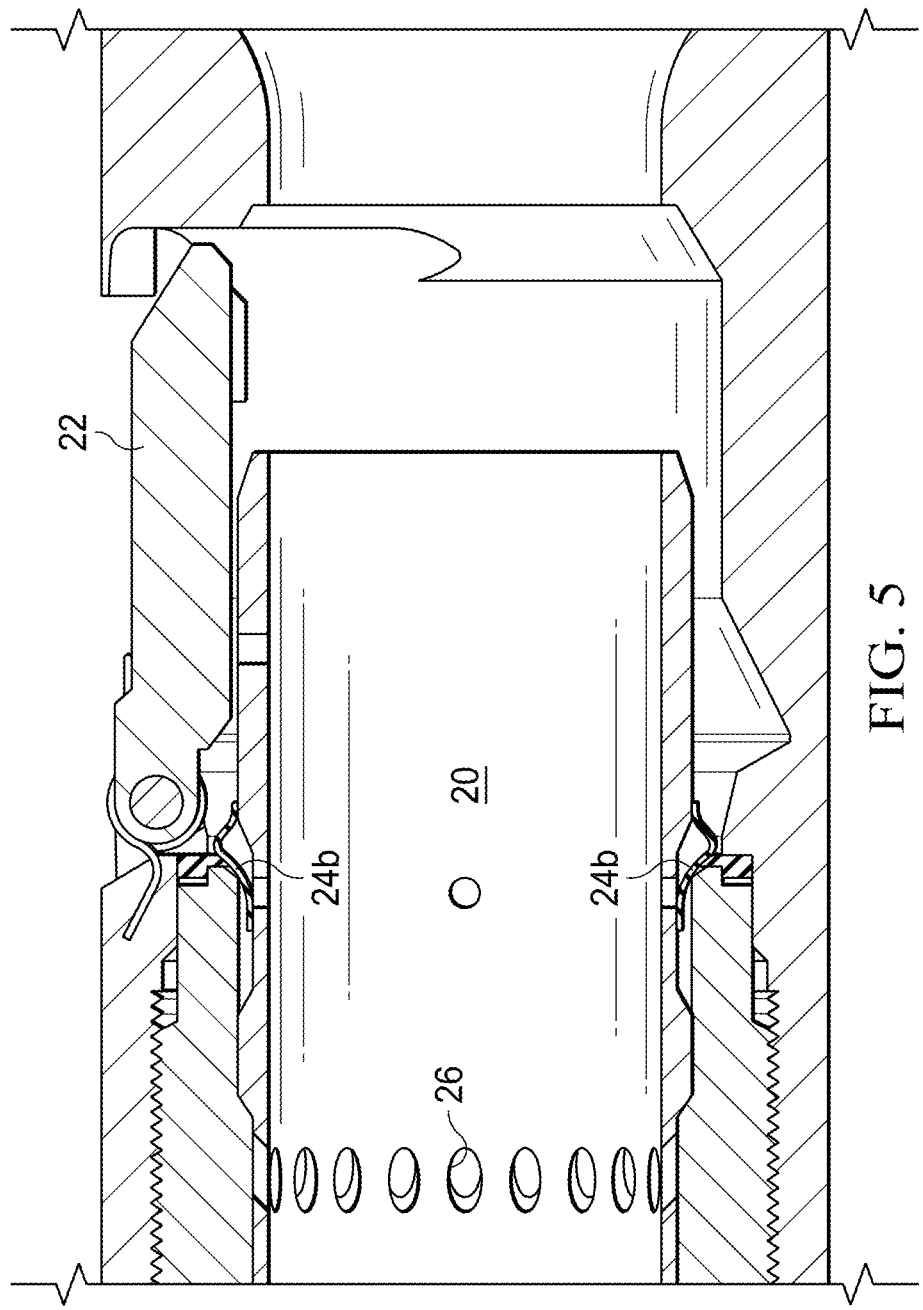
FIG. 5 is an illustration of a side view of the opening prong having both the flow holes and the wiper, in accordance with certain example embodiments.
Figure 6:
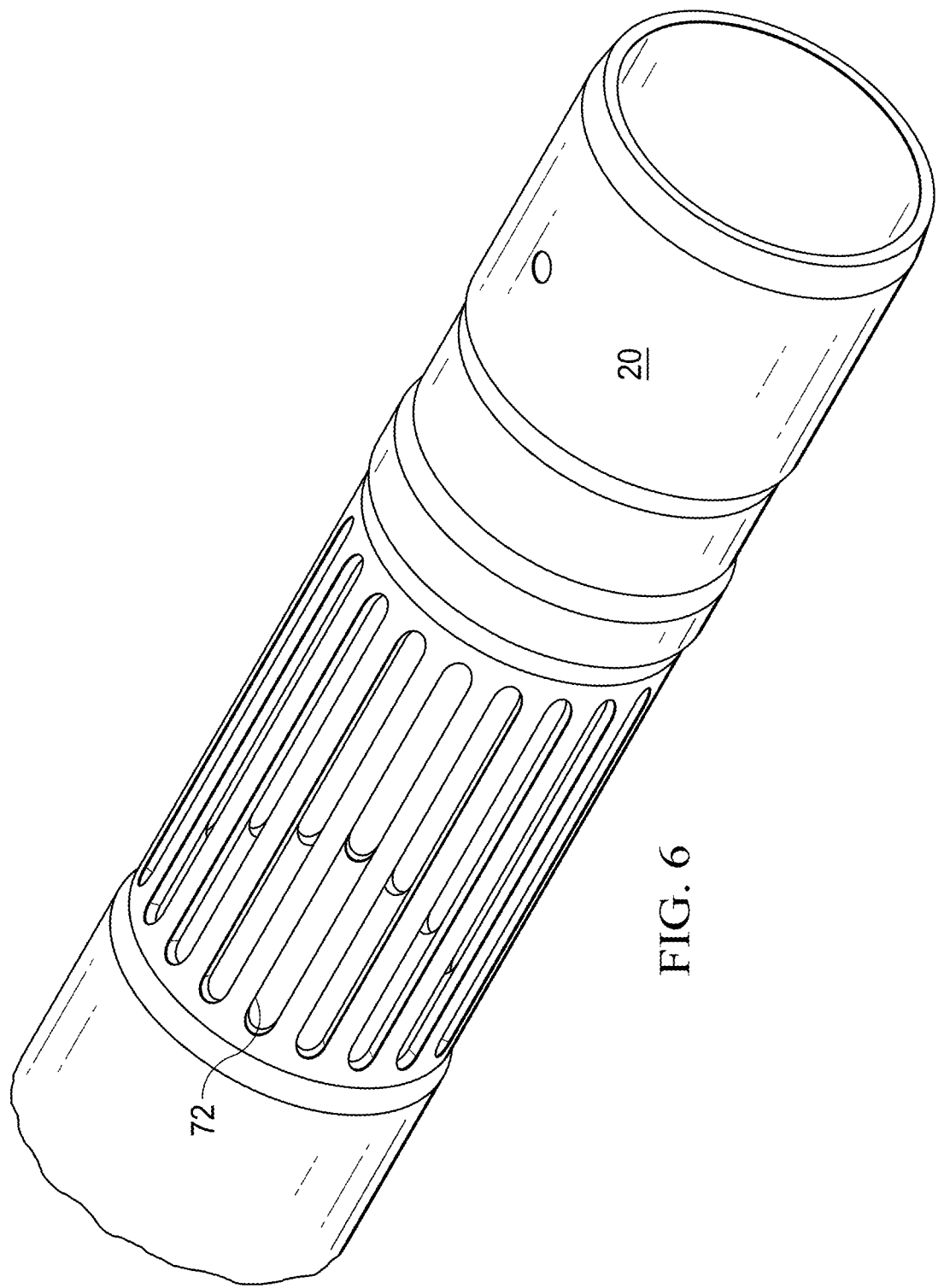
FIG. 6 is an illustration of a side view of the opening prong and an alternative configuration wherein the flow holes are in the form of slots, in accordance with certain example embodiments.
Figure 7:
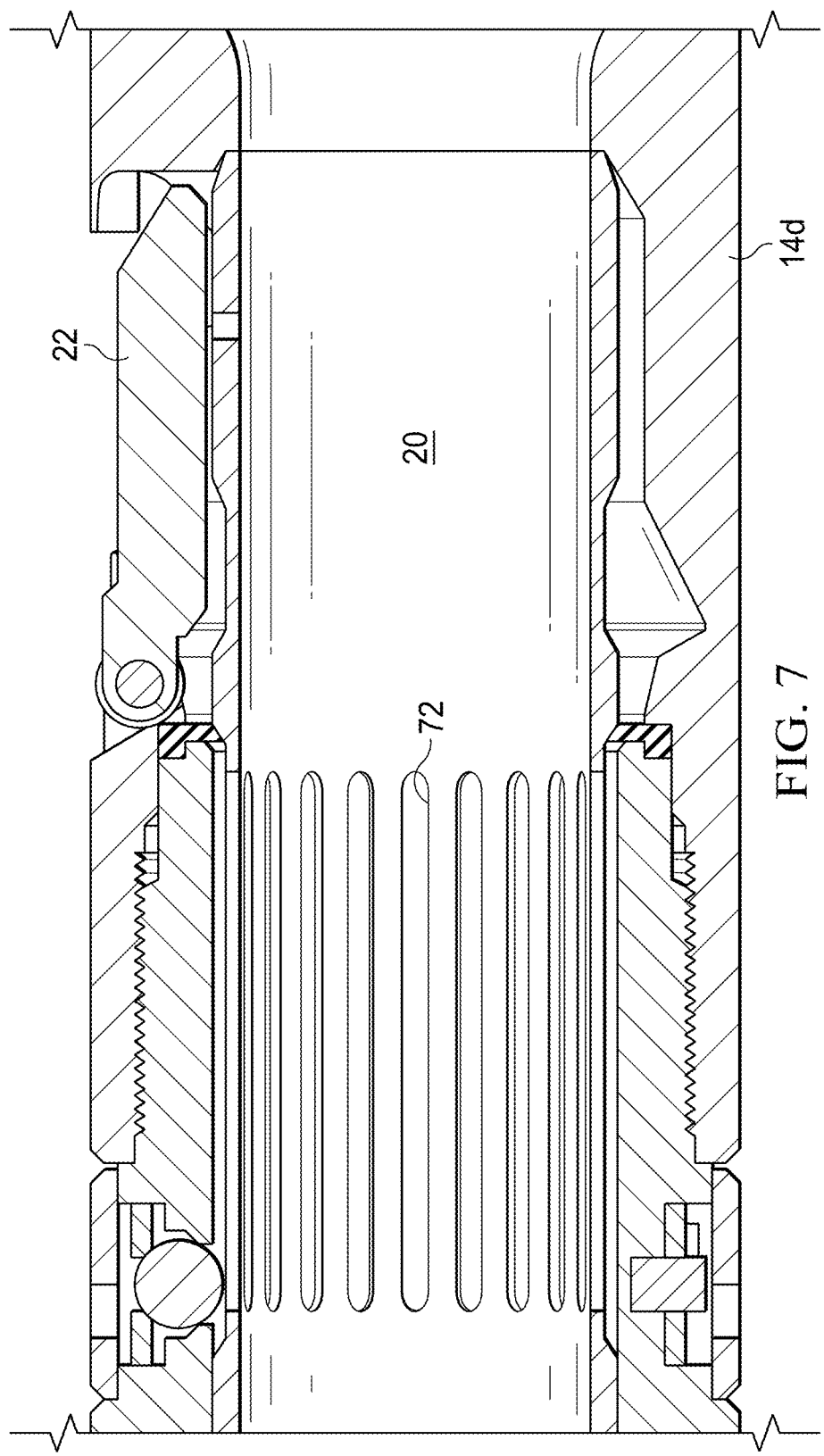
FIG. 7 is an illustration of a side view of the opening prong and an alternative view of the slots of FIG. 6.
Figure 8:
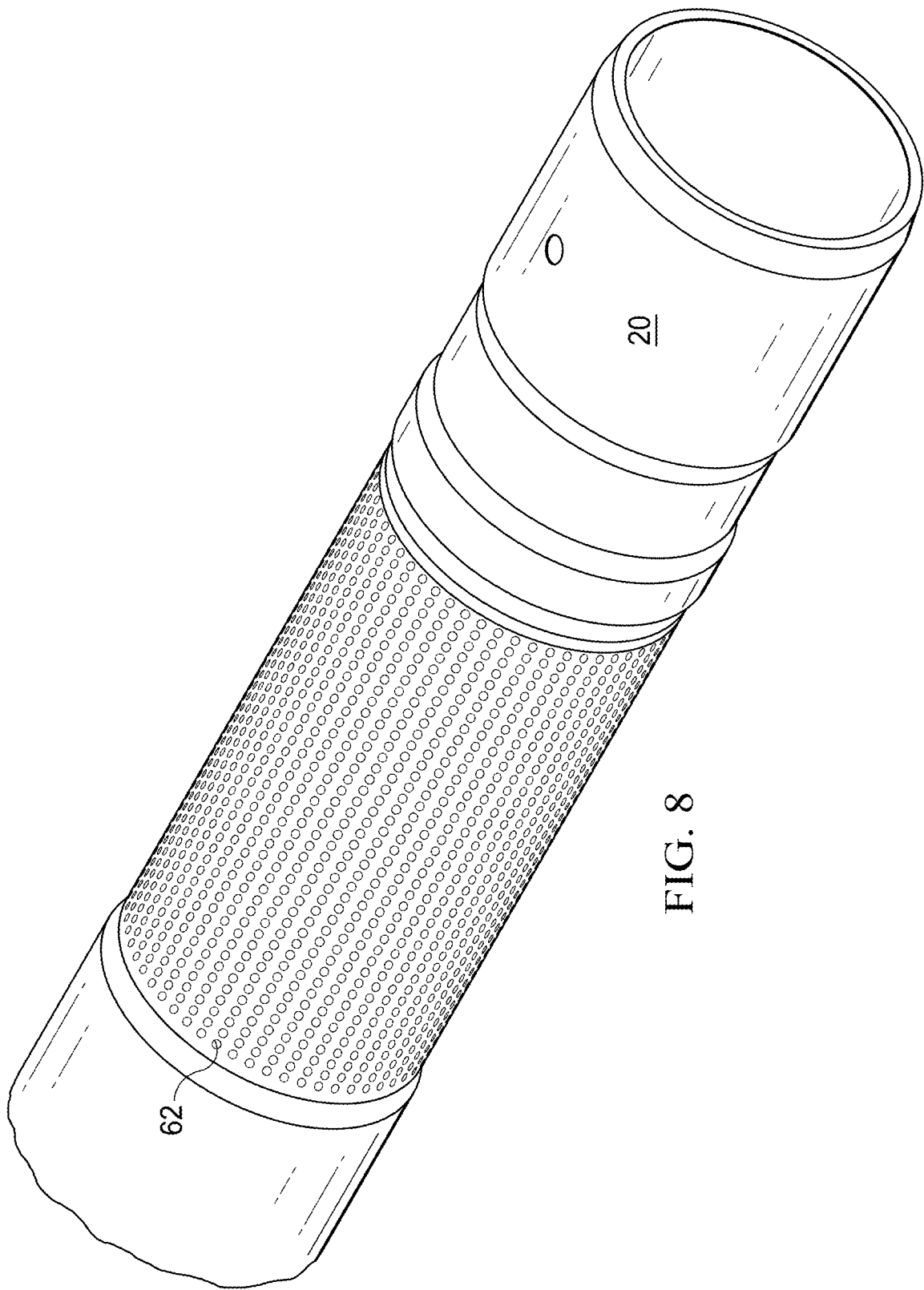
FIGS. 8 and 9 are illustrations of isometric views of screen integrated with opening prong of FIG. 4B.
Figure 9:
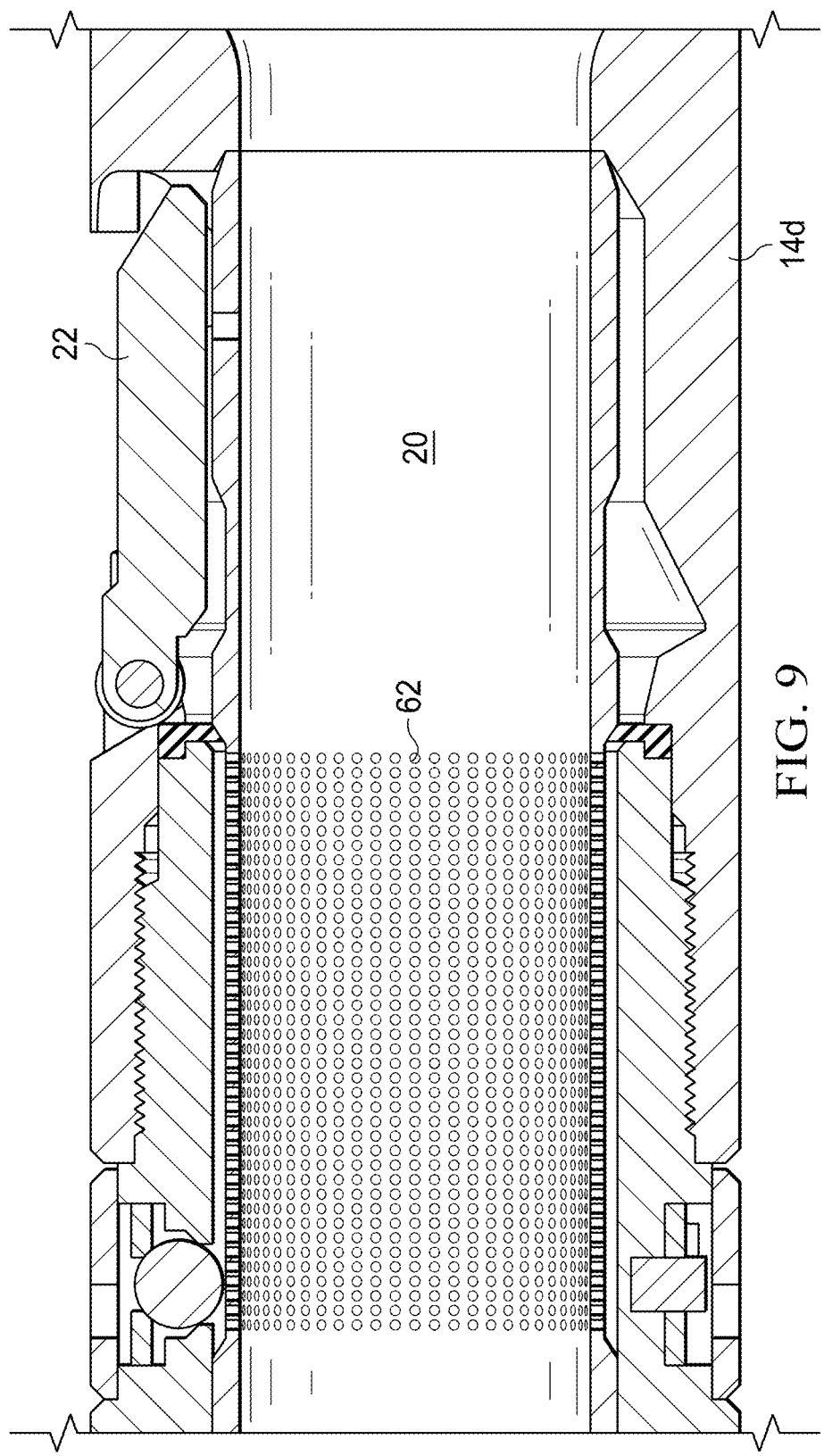

Referring now to FIG. 5, illustrated is a side view of the opening prong 20 having both the flow holes 26 and the wiper 25. FIG. 6 illustrates a side view of the opening prong 20 and an alternative configuration wherein the flow holes are in the form of slots 72. FIG. 7 is a side view of the opening prong 20 and an alternative view of the slots 72 of FIG. 6. FIGS. 8 and 9 are isometric views of screen 62 integrated with opening prong 20 of FIG. 4B, i.e. the holes are drilled into the opening prong 20. It should be understood that the opening prong 20 can include any number of flow holes 26 or slots 72 or any combination thereof. The flow holes 26 and slots 72 are integrated directed into the opening prong 20 and the opening prong 20 is made of steel based metals.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a sub-surface safety valve for integration within a production tubing system, the safety valve assembly having a positional flapper and valve seat, the safety valve sub-surface safety valve comprising: a remotely actionable opening prong comprising at least one of a wiper, screen, and flow holes; wherein the wiper, screen, and flow holes function according to either position or movement of the flapper and prevent debris buildup around the valve seat;

Clause 2, the sub-surface safety valve of cause 1 wherein the wiper is a formable material in communication with the valve seat and a surface of the opening prong;

Clause 3, the sub-surface safety valve of clause 2 wherein the wiper extends radially in response to closing the flapper;

Clause 4, the sub-surface safety valve of clause 2 wherein the wiper is made of at least one of a metal, alloy, an elastomer, non-elastomeric polymers, and plastic;

Clause 5, the sub-surface safety valve of clause 1 wherein the plurality of flow holes are angled flow holes;

Clause 6, the sub-surface safety valve of clause 1 wherein the flow holes are a plurality of elongated slots;

Clause 7, the sub-surface safety valve of clause 1 wherein the filter comprises a screen either integrated with the opening prong and or positioned around a section of the opening prong;

Clause 8, the sub-surface safety valve of clause 1 wherein the filter is downstream from the valve seat;

Clause 9, a sub-surface safety valve comprising: a positional flapper; a remotely actionable opening prong comprising at least one of an extendible wiper, filter, and at least one flow hole; wherein the wiper, filter, and the at least one flow hole function according to either position or movement of the flapper and prevent debris buildup around the valve seat;

Clause 10, the sub-surface safety valve of clause 9 wherein the extendible wiper is in communication with the valve seat and a surface of the opening prong;

Clause 11, the sub-surface safety valve assembly of clause 10 wherein the extendible wiper extends radially in response to a closing action of the flapper;

Clause 12, the sub-surface safety valve of clause 9 wherein the wiper is made of at least one of a metal, alloy, an elastomer, non-elastomeric polymers, and plastic;

Clause 13, the sub-surface safety valve of clause 9 wherein the at least one flow hole is at least one elongated slot;

Clause 14, the sub-surface safety valve of clause 9 wherein the filter comprises a screen either integrated with the opening prong and or positioned around a section of the opening prong;

Clause 15, the sub-surface safety valve assembly of clause 9 wherein the filter is downstream from the valve seat;

Clause 16, the sub-surface safety valve assembly of clause 9 wherein the at least one flow hole is an angled flow hole;

Clause 17 a method of using a sub-surface safety valve integrated with a production tubing system, the safety valve assembly having a positional flapper and valve seat, the method comprising: remotely activating an opening prong causing a position of the flapper to change; performing, in response to activating, at least one of a wiping of or rinsing of a valve seat in response to either position or movement of the flapper; wherein the opening prong comprises at least one of a wiper, filter, and flow holes;

Clause 18, the method of clause 17 wherein the wiper is an expandable material in communication with the valve seat and a surface of the opening prong.

Clause 19, the method of clause 18 wherein the wiper compresses and expands in response to an opening and closing action of the flapper; and Clause 20, the method of clause 16 wherein the plurality of flow holes are one of a plurality of elongated slots and angled flow holes.

What is claimed is:

1. A sub-surface safety valve for integration within a production tubing system, the sub-surface safety valve assembly having a positional flapper and valve seat, the sub-surface safety valve comprising:
   a remotely actionable opening prong comprising a wiper and at least one of a plurality of flow holes a filter, and a screen;
   wherein at least one of the filter, the wiper, the screen, and the plurality of flow holes function according to either position or movement of the flapper or opening prong and prevent debris buildup around the valve seat, and wherein at least one flow hole of the plurality of flow holes is an angled flow hole or is an elongated slot, and wherein the wiper extends radially in response to closing of the flapper.

2. The sub-surface safety valve of claim 1 wherein the wiper is a formable material in communication with the valve seat and a surface of the opening prong.

3. The sub-surface safety valve of claim 2 wherein the wiper is made of at least one of a metal, alloy, an elastomer, non-elastomeric polymers, and plastic.

4. The sub-surface safety valve of claim 1 wherein the screen either integrated with the opening prong and or positioned around a section of the opening prong.

5. The sub-surface safety valve of claim 1 wherein the filter is downstream from the valve seat.

6. A sub-surface safety valve comprising:
   a positional flapper; and
   a remotely actionable opening prong comprising an extendible wiper and at least one of a flow hole and a filter;
   wherein at least one of the wiper, the filter, and the at least one flow hole function according to either position or movement of the flapper or opening prong and prevent debris buildup around a valve seat, wherein the at least one flow hole is an angled flow hole or an elongated slot, and wherein the wiper extends radially in response to closing of the flapper.

7. The sub-surface safety valve of claim 6 wherein the extendible wiper is in communication with the valve seat and a surface of the opening prong.

8. The sub-surface safety valve of claim 6 wherein the wiper is made of at least one of a metal, alloy, an elastomer, non-elastomeric polymers, and plastic.

9. The sub-surface safety valve of claim 6 wherein the filter comprises a screen either integrated with the opening prong and or positioned around a section of the opening prong.

10. The sub-surface safety valve of claim 6 wherein the filter is downstream from the valve seat.

11. The sub-surface safety valve of claim 6 wherein the at least one flow hole is an angled flow hole.

12. A method of using a sub-surface safety valve integrated with a production tubing system, the sub-surface safety valve having a positional flapper and valve seat, the method comprising:
   remotely activating an opening prong causing a position of the flapper to change;
   performing, in response to activating, at least one of a wiping of or rinsing of the valve seat in response to either position or movement of the flapper or opening prong;
   wherein the opening prong comprises a wiper and at least one of a plurality of flow holes and a filter, wherein at least one flow hole of the plurality of flow holes is an elongated slot or an angled flow hole; and
   extending the wiper radially in response to closing of the flapper.

13. The method of claim 12 wherein the wiper is an expandable material in communication with the valve seat and a surface of the opening prong.

14. The method of claim 13 wherein the wiper compresses and expands in response to an opening and closing action of the flapper.

* * * * *